Feb. 22, 1966 J. C. QUADY ET AL 3,236,202

WATER CRAFT

Filed Dec. 9, 1964 3 Sheets-Sheet 1

INVENTORS.
JOHN C. QUADY,
KENNETH L. McLELLAN,
GEORGE H. SCHILLREFF,

By
ATTORNEY.

Feb. 22, 1966     J. C. QUADY ET AL     3,236,202
WATER CRAFT
Filed Dec. 9, 1964     3 Sheets-Sheet 2
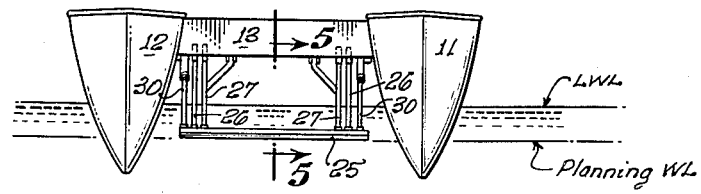
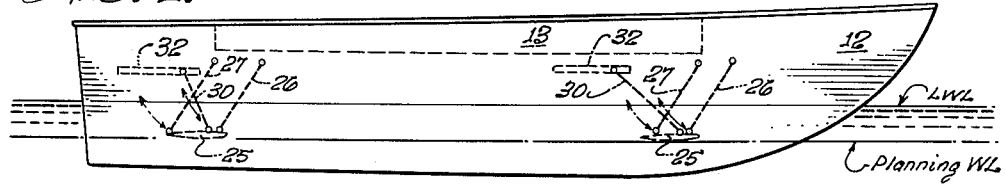
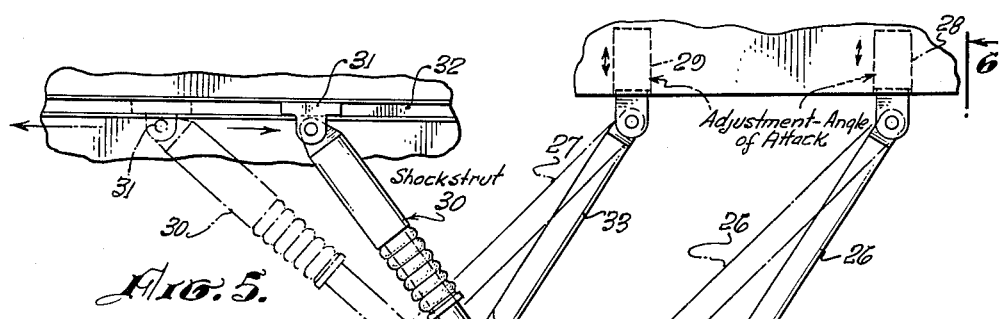
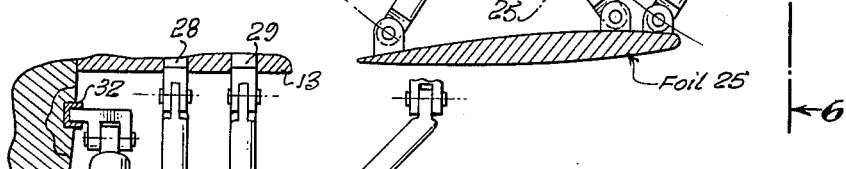
INVENTOR.
JOHN C. QUADY,
KENNETH L. McLELLAN,
GEORGE H. SCHILLREFF,
By *[signature]*
ATTORNEY.

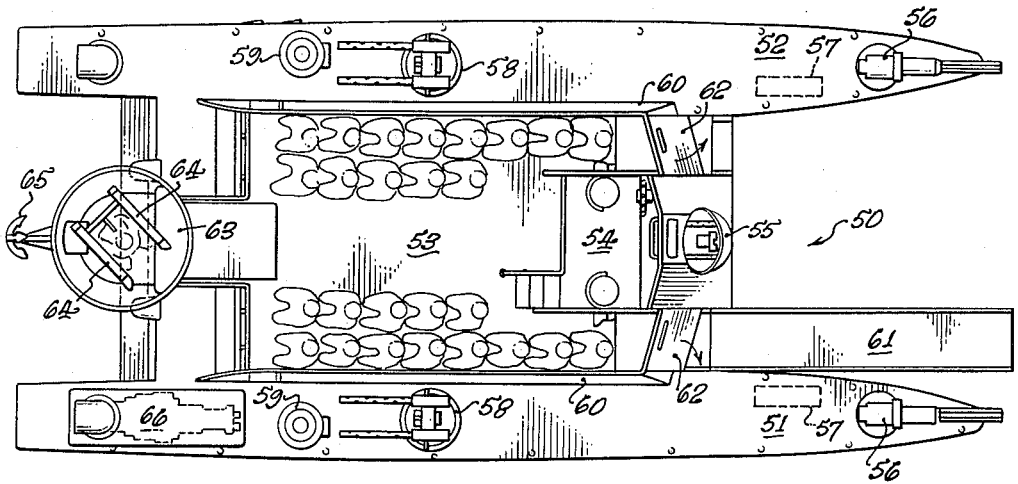
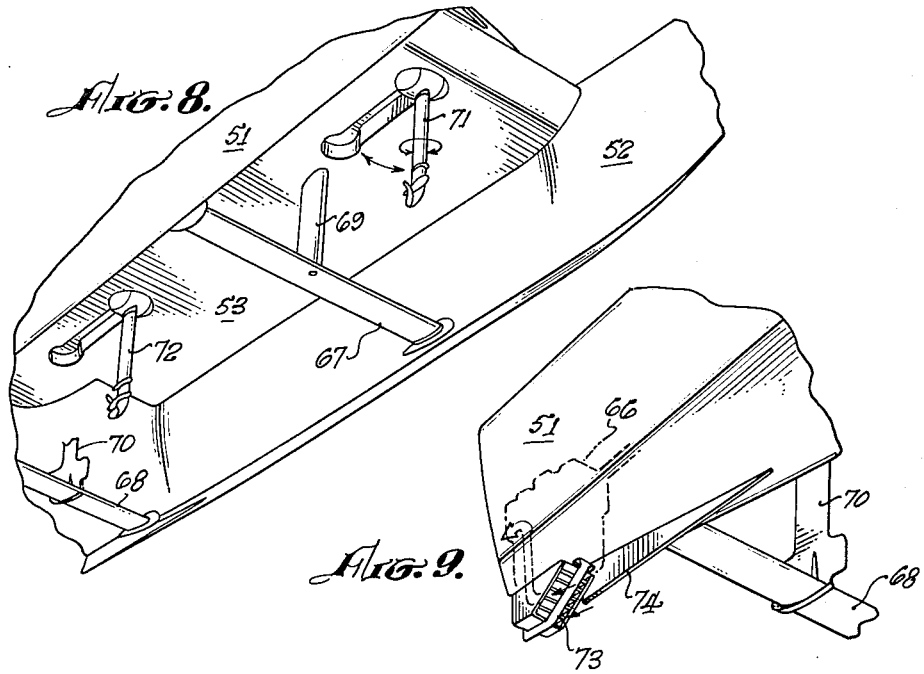
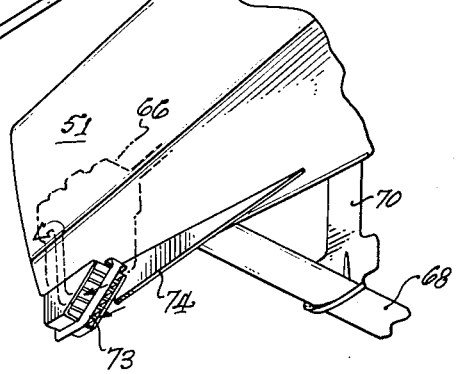

United States Patent Office 3,236,202
Patented Feb. 22, 1966

3,236,202
WATER CRAFT
John C. Quady, Pomona, Calif., Kenneth L. McLellan, Alexandria, Va., and George H. Schillreff, Glendora, Calif., assignors to General Dynamics Corporation, Pomona, Calif., a corporation of Delaware
Filed Dec. 9, 1964, Ser. No. 417,016
15 Claims. (Cl. 114—66.5)

This invention relates to water craft, particularly to relatively small water craft having the capability of remaining under way for long periods of time and having high speed capabilities.

A requirement has long existed for small and emergent nations with limited naval resources to be capable of patrolling their costal waters in an efficient and economical manner and of providing offshore support in the suppression of activities on shore.

In view of this requirement a need was seen for a craft which possesses the following attributes:

(1) An ability to remain on station for long periods of time, which indicates that the craft could be capable of sailing under wind power or by relatively small outboard type motors.

(2) A capability of entering and leaving a particular area at high speed over submerged reefs, sand bars, and shallow or debris laden water. The craft must possess sufficient power to run at high speeds and in high sea states for periods of time longe enough to enable hit and run tactics.

(3) Have sufficient size so as to provide reasonable living accommodations for the crew for periods from one to several months and/or have the capability for transporting personnel for assault type landings.

(4) The ability to carry suitable armament, such as guns, deck launched torpedoes, missiles, and appropriate radar and sonar devices, as required, and to employ the armament efficiently.

(5) A capability of being beached and refloated under its own power thus eliminating the need of docking facilities.

In answer to the above requirements this invention provides such a water craft of the catamaran type which has the ability to stay at sea for long periods of time without requiring an excessively large fuel supply. In order to achieve the speed requirement, which may be approximately 60 knots for periods of 10-15 hours, the craft is provided with hydrofoil lifting surfaces, one forward and one aft, which extend between the hulls. The lifting surfaces are movable in angle of attack, so as to control the trim of the craft depending upon the weight, C.G., sea conditions, and speed. For traveling in the high speed mode, the water craft of the invention is provided with a suitable power plant in each hull which develops a high horsepower output, such as a turbo shaft jet or high speed diesel engine, and which is geared to either a shrouded propeller or into a hydro jet or equivalent non-fouling water thrust device.

In addition to the above features of the invention, the catamaran configuration has additional advantages because of its breadth and stability and its large deck area in proportion to the displacement. Such large deck area lends itself to proper utilization of armament while providing sufficient area for transporting assault personnel or supplies.

Therefore, it is an object of this invention to provide a water craft having high speed capability combined with the ability to stay at sea for long periods of time.

A further object of the invention is to provide a water craft having the capability of entering and leaving a particular area at high speeds for activities such as landing assault troops or supplies.

Another object of the invention is to provide a water craft having the capability of operating at high speed in shallow or debris laden water and riding over sand bars or submerged obstacles.

Another object of the invention is to provide a water craft which can move with essentially no noise combined with a high-speed dash capability.

Another object of the invention is to provide a water craft of the catamaran type which is provided with a retractable sail assembly for long duration relatively slow speed operation and with hydrofoil lifting surfaces for high speed operation powered by a reaction type power plant.

Another object of the invention is to provide a high speed water craft capable of carrying assault troops or supplies and landing same on the beach combined with the ability to pull itself off the beach, thus eliminating the need of docking facilities.

Another object of the invention is to provide a water craft having high speed capabilities coupled with high maneuverability at low speeds.

Other objects of the invention will become readily apparent from the following description and accompanying drawings wherein:

FIG. 3 is a partial front view of the FIG. 1 water craft;

FIG. 4 is a schematic view illustrating the movability of the lifting surfaces of the FIG. 1 water craft;

FIG. 5 is an enlarged side view taken along line 5—5 of FIG. 3 and illustrating lifting surfaces control mechanism;

FIG. 6 is an enlarged partial front view of the FIG. 5 mechanism taken along lines 6—6 of FIG. 5;

FIG. 7 is a plan view of another embodiment of the invention;

FIG. 8 is a partial view of the bottom of the FIG. 7 water craft illustrating the lifting surfaces and the retractable outboard maneuvering motors; and FIG. 9 is a partial view illustrating the protective grill for the propulsion units of the FIG. 7 craft.

Figure 1:
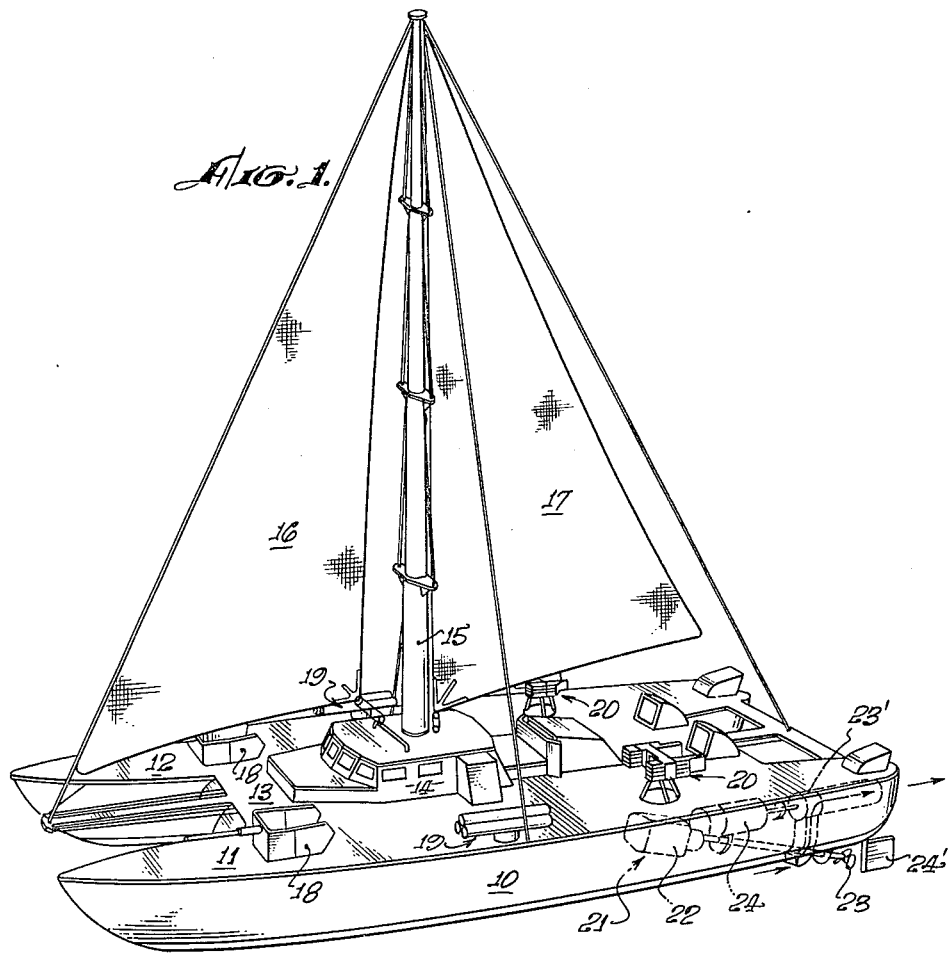
FIG. 1 is a perspective view illustrating an embodiment of the invention under sail mode operation.

Broadly, the invention relates to an offshore antisubmarine control craft, high speed assault craft, or the like having a catamaran hull and hydrodynamic lift devices such as hydrofoils, and which may be propelled alternatively by said or outboard motors or by a diesel or turbo jet engine located in each hull and geared to a non-fouling propeller or water thrust device.

Referring now to the drawings, FIGS. 1-6 illustrate a water craft, such as a counter insurgency patrol boat, which is essentially a complete weapon system with total facilities for crew and the necessary weapons for fighting a variety of naval or counter insurgency activities. Basically the craft 10 is a cruising type sailing catamaran having hulls 11 and 12 interconnected by decking 13 upon which a control cabin 14 and other equipment described hereinafter is located. The craft 10 is provided with a telescoping type mast 15 and operatively connected sails 16 and 17 with sail rigging equipment. Positioned on the deck 13 toward the bow of hulls 11 and 12 are gun mounts 18 for weapons such as 40 mm. units. Positioned port and starboard at approximately the center of the craft are sets of torpedo launcher tubes indicated at 19. A set of rocket launchers 20 are mounted port and starboard aft of the torpedo tubes 19. In the aft end of each of the hulls 11 and 12, a high speed propulsion system indicated generally at 21 (only one being shown) is positioned. Propulsion system 21 may, for example, as indicated in phantom in FIG. 1, include a light weight power plant capable of developing high horsepower such as diesel or turbo engine 22 which may be geared either through a propeller 23 or geared into a water thrust unit 23′ via gearing 24 and having a water flow indicated by the arrows. The craft 10 is provided with a rudder assembly indicated at 24′, operatively mounted in each hull 11 and 12.

Figure 2:
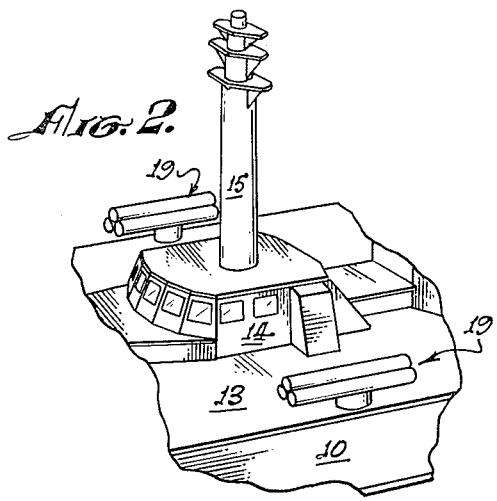
FIG. 2 is a partial view of the FIG. 1 water craft rigged for high speed operation.

FIG. 2 shows the water craft 10 prepared for high speed operation wherein the sails 16 and 17 are removed or stowed and the telescoping mast 15 is retracted to reduce drag. The mechanism for extending and retracting the mast 15 can be of any conventional type and does not constitute part of the invention and therefore a detailed description is deemed unnecessary.

Referring now to the hydrodynamic lifting surfaces incorporated into craft 10 for high speed operation, a lifting surface such as a hydrofoil 25 is mounted fore and aft between hulls 11 and 12, as shown in FIGS. 3-6. FIGS. 3 and 4 show the low speed water line (LWL) for operation of craft 10 and the high speed water line (Planing WL) for illustrating the operation of hydrofoils 25 which reduces the displacement of the craft with respect to the displacement at low speeds.

As illustrated in FIGS. 4-6, the hydrofoils 25 are provided with mechanism to extend and retract same and to vary the angle of attack, so as to control the trim of the craft 10 depending upon the weight, C.G., sea conditions, and speed. This mechanism as shown in FIGS. 5 and 6 includes a pair of arms 26 and 27 pivotally interconnecting the fore and aft ends of each of foils 25 to the undersurface of deck 13 via movable support members 28 and 29. Support members 28 and 29 are connected with means (not shown) for raising and lowering either of the members as indicated by the arrows for adjusting the angle of attack of the foil 25. While only one pair of arms 26 and 27 are shown in FIGS. 5 and 6, each foil 25 is provided with a pair at each end thereof as schematically illustrated in FIGS. 3 and 4. A shock strut 30 pivotally attaches each side of each of foils 25 to movable supports 31 each of which is slidably mounted in a track 32 in deck 13 as shown in FIG. 5. Supports 31 are moved by mechanism (not shown) to extend, retract or adjust the depth of the foils 25. Each of shock struts 30 is constructed so as to absorb shocks received by the foils 25 thus minimizing the transmission thereof to the craft 10. As illustrated in FIG. 6, the foil support mechanism may include an angle support lever 33 pivotally extending from deck 13 to rear arms 27 to prevent sideways movement of foils 25. If desired, the forward foil 25 can be trimmed separate from the aft foil.

For operations of craft 10 such as patrolling, the mast 15 is extended, the sails 16 and 17 rigged, as shown in FIG. 1, the power plants 21 shut down, and the lifting surfaces 25 retracted, if desired. Thus the craft is essentially silent and cannot be detected by sonar, while in turn, with a sonar system mounted on or towed by the craft 10 it would be able to detect submarines or other seaborne vehicles.

Upon need for high speed operation the sails 16 and 17 are stowed and the mast 15 is retracted, as shown in FIG. 2, the towed sonar if utilized is drawn in, and the high speed propulsion system 21 is started and the hydrofoils 25 are lowered to a desired position whereby the craft may travel at speeds of approximately 60 knots, for example, enabling high speed hit and run tactics or other desired maneuvers for defending or attacking with the weapons mounted thereon.

FIGS. 7-9 illustrate a water craft 50 of the catamaran class having hulls 51 and 52 interconnected by decking 53 upon which is located a control bridge 54 at the forward end thereof. Rotatably mounted at the forward end of bridge 54 is a turret 55 from which guns 56 are controlled, guns 56 may be, for example, 20 mm. having 6,000 rounds per min. firing capability. Turret 55 and guns 56 may be mounted for at least a 90° field of fire either to port or starboard from the forward direction and for approximately a 60° vertical field of fire. Ammunition magazines 57 are positioned behind each of guns 56 within hulls 51 and 52. Also mounted on each of hulls 51 and 52 at about the center of the craft 50 are gun mounts 58 which may be twin 50 cal. machine guns. Gun mounts 58 have approximately 180° field of fire on the starboard and port sides, respectively. Positioned to the rear of gun mounts 58 on each hull is a hatch 59 for access to the interior of hulls 51 and 52.

A protective wall indicated at 60 interconnects the control bridge 54 on each side thereof and extends rearwardly to protect assault troops or supplies located on the deck 53 aft of bridge 54. Extendable ramps 61 (only one shown) are located adjacent each hull for ease of unloading personnel or supplies, ramps 61 being stowed under the upper decking when not in use. Movable portions 62 of wall 60 are designed to swing to the side to provide passage from the area therewithin to the ramps 61. Positioned aft of the personnel deck area is a rocket launcher mount 63 having a launcher 64 rotatably mounted thereon. Mounted to the rear of launcher mount 63 is an anchor 65 operatively connected to a winch (not shown) which can be utilized for pulling the craft 10 from the beach or the like.

Mounted in the aft end of each of hulls 51 and 52 is a power plant indicated generally at 66 (only one being shown). Power plant 66 may be of the type described above with respect to the FIGS. 1-6 embodiment or any other desirable propulsion system which will fulfill the individual applications.

Craft 50 may also be provided with the necessary radio, radar and other equipment, not constituting part of this invention and therefore not illustrated or described.

Referring now to FIGS. 8 and 9 which show the underside of craft 50 and illustrate the lifting surfaces and/or maneuvering motors, the hydrodynamic lifting surfaces comprise a pair of hydrofoils 67 and 68 mounted between hulls 51 and 52. Foils 67 and 68 may be provided with means (not shown) for changing the angle of attack as described with respect to the FIG. 1 embodiment. Each of foils 67 and 68 is provided with a central support member 69 and 70, respectively. The aft central member 70 additionally functions as a rudder for craft 50. The central support member 69 may also be rotated so as to provide a lateral force thus acting in the manner of a center board in the sailing mode and/or to provide a pivotal reaction force in combination with the rudder 70 force to improve turning ability.

The placement of the forward or main lifting foil 67 near the craft's center of gravity (C.G.) and the aft or stabilizing foil well toward the stern provides a large moment arm thus providing the craft with an inherent stability in pitch in much the same way that the wing and horizontal tail surface (stabilizer) of a conventional aircraft provides the aircraft with longitudinal (pitching) stability. Therefore, the need for an autopilot or other complicated control mechanism required by most hydrofoil craft to provide longitudinal (pitch) stability is eliminated by this invention. Furthermore, the aft foil 68 is capable of being controlled in incidence during high speed operation by means of a control system (not shown) much like that of an aircraft which operates the elevators so that the craft may be steered in pitch to enable riding with the swells or waves in high sea states.

Retractably hung from the lower surface of deck 53 are a pair of outboard type motors 71 and 72 for maneuvering the craft 50 and for slow speed operating modes. Motors 71 and 72 provide the craft with the capability of rotating essentially on an axis, thus greatly improving maneuvering.

To prevent damage to the water intake of the thrust propulsion system, a protective grill 73 of suitably spaced vanes is mounted at the lower aft end of each of hulls 51 and 52 (only one shown) as illustrated in FIGS. 9. A skeg 74 (only one shown) is positioned forward of and adjacent to grill 73 on each hull. The vanes of grill 73 direct the flow of water into the thrust unit of power plant 66 as indicated by the arrows in FIG. 9. The grill 73 is especially needed when the craft is propelled onto the beach, during landing of personnel or supplies, to prevent foreign material of sufficient size to damage the propulsion unit from entering the same.

It has thus been shown that the present invention provides water craft adaptable to many uses but more particularly as a counter insurgency weapon system basically comprising a cruising type catamaran with propulsion systems for cruising or high speed modes of operation. The water craft of the invention has the following advantages: (1) capable of staying at sea over extended time periods; (2) has low maintenance cost; (3) relatively low initial cost; (4) the ability to operate with poorly trained crews; (5) ability to engage high speed planing craft such as torpedo boats; (6) ability to operate in debris-laden water, and over submerged obstacles or sand bars; (7) capability of carrying a variety of weapons; (8) capability of carrying and landing assault personnel or supplies; and (9) has good maneuverability and capability of withdrawing itself from sand bars or beaches.

While the embodiments of the invention illustrated have shown a single mast and single support members for the hydrofoils, for example, plural masts and/or support members may be utilized if desired. Also, various types of propulsion systems may be effectively used in the craft illustrated.

To enhance the capability of the craft to travel over debris-laden water, submerged obstacles, or to be propelled onto the beach or over sand bars without damage to the hulls, the craft may be provided with metal strips or runners (not shown) which extend along the contact surfaces of the hulls.

Although particular embodiments have been illustrated and described, it will be obvious to those skilled in the art that various changes and modifications may be made without departing from the invention, and it is intended to cover in the appended claims all such changes and modifications as come within the true spirit and scope of the invention.

What we claim is:

1. A water craft including a pair of hulls interconnected by decking, means for propelling the craft at low speeds, said low speed propelling means including at least one telescoping mast mounted on said decking, and at least one sail rigged to said mast, means for propelling the craft at high speeds, said high speed propelling means including a high horsepower inboard power plant mounted in each of said hulls and operatively connected for driving propelling mechanism, said high speed propelling means additionally including a plurality of hydrodynamic lifting surfaces operatively positioned intermediate said hulls, one of said hydrodynamic lifting surfaces being positioned near the center of gravity of said water craft.

2. The water craft defined in claim 1, wherein said low speed propelling means additionally includes at least one outboard type motor retractably mounted in said decking, said outboard type motor additionally functioning to increase low speed maneuverability of said water craft.

3. The water craft defined in claim 1, wherein at least one of said hydrodynamic lifting surfaces is provided with mechanism for changing the angle of attack thereof.

4. The water craft defined in claim 1, wherein said plurality of hydrodynamic lifting surfaces comprises a pair of hydrofoils.

5. The water craft defined in claim 4, wherein said hydrofoils are retractably positioned between said hulls.

6. The water craft defined in claim 5, wherein at least one of said hydrofoils is provided with means for changing the angle of attack thereof.

7. The water craft defined in claim 6, wherein said hydrofoils are provided with shock absorbing mechanism mounted between each of said hydrofoils and said craft.

8. The water craft defined in claim 4, wherein said hydrofoils are fixed to said hulls of the craft.

9. The water craft defined in claim 1 additionally including means for absorbing shock mounted between said hydrodynamic lifting surfaces and said craft.

10. The water craft defined in claim 1 additionally including means for pulling the craft from contact with land.

11. The water craft defined in claim 1 additionally including grill means for protecting the said high speed propelling mechanism from foreign material to prevent damage thereto.

12. A water craft including a pair of interconnected hulls, power plant means mounted in each of said hulls for providing high speed operation, auxiliary power means for providing relatively low speed operation, a plurality of hydrofoils retractably positioned between said hulls, each of said hydrofoils being provided with mechanism for varying the angle of attack thereof, and means for absorbing shock mounted between each of said hydrofoils and said craft, each of said power plant means including a high horsepower inboard engine and a water thrust type propulsion unit, said auxiliary power means including a telescoping type mast and at least one sail operatively rigged thereon.

13. The water craft defined in claim 1, wherein said high horsepower inboard power plant includes a high horsepower engine, and wherein said propelling mechanism includes a water thrust type propulsion unit.

14. The water craft defined in claim 13, wherein said propelling mechanism additionally includes a propeller and selective interconnecting gearing.

15. The water craft defined in claim 1, additionally including at least one extendable ramp means operatively mounted with respect to said decking and adapted to extend forwardly between said hulls for loading and unloading of said craft.

References Cited by the Examiner

UNITED STATES PATENTS

| 811,743 | 2/1906 | Reeve | 114—66.5 |
|---|---|---|---|
| 2,065,715 | 12/1936 | Leon | 114—90 |
| 2,370,318 | 2/1945 | Lake | 114—66.5 |
| 2,703,063 | 3/1955 | Gilruth | 114—66.5 |
| 3,016,864 | 1/1962 | Woodfield | 114—61 |
| 3,116,708 | 1/1964 | Gardhouse | 114—61 |

References Cited by the Applicant

UNITED STATES PATENTS

| 372,761 | 11/1887 | Palmer. |
| 2,354,453 | 7/1944 | Gazda. |
| 2,804,038 | 8/1957 | Barkla. |
| 2,996,030 | 8/1961 | Lornson. |
| 3,077,850 | 2/1963 | Beuby. |
| 3,106,179 | 10/1963 | Traksel et al. |
| 3,112,725 | 12/1963 | Malrose. |

MILTON BUCHLER, *Primary Examiner.*

ANDREW H. FARRELL, *Examiner.*